United States Patent Office 3,730,935
Patented May 1, 1973

3,730,935
PROCESS FOR THE PRODUCTION OF BONDED PARTICLES AS A MATERIAL OF CONSTRUCTION
Clifford V. Wittenwyler, Cherry Hill, N.J., assignor to Shell Oil Company, New York, N.Y.
No Drawing. Filed June 9, 1971, Ser. No. 151,531
Int. Cl. C08g 51/34
U.S. Cl. 260—33.4 EP         14 Claims

ABSTRACT OF THE DISCLOSURE

Foundry cores having increased pot life are prepared by (1) mixing from about 90 to 99 parts by weight of foundry sand with from 1 to 10 parts by weight of a polyepoxide binder, (2) mixing said blend with (a) a curing amount of a boron trihalide complex, especially boron trifluoride dihydrate, in an oxygenated hydrocarbon and (b) a monofunctional aromatic tertiary amine, (3) packing the blend into suitable forms and (4) allowing the polyepoxide to cure with or without heating.

BACKGROUND OF THE INVENTION

Field of the invention

This invention involves a process for the preparation of a controlled rapid-cure foundry core which is curable at ambient temperatures.

Prior art

In the foundry industry, foundry cores are used in helping to shape that part of a casting not readily shaped by the mold proper. With today's high production rates, modern foundry practice requires rapid core production and sometimes requires that foundry cores be made on a one-to-five minute cycle without heat curing. Not only do metal foundries require a fast curing core, but the core also should be low cost and of light weight refractory material as well.

Presently, various resins such as the B-staged phenol-formaldehydes and urea-formaldehydes are used to bond sand into such required shapes, but they require rather extensive heating of the core box to effect the required cure (Introduction to Foundry Technology, Ekey, D. C. and Winter, W. P., McGraw-Hill Book Company, Inc., New York, N.Y., 1958). Although these resins result in adequate cores, the heating often results in a short life for the core box, dimensional changes in the core as it cools, non-uniform curing due to poor heat transfer, especially in large pieces, and inefficient use of the core box because of the long cure time.

Various attempts have been made to eliminate or reduce these shortcomings including the utilization of epoxy resins as binder agents. Epoxy resins, however, are relatively more expensive than the conventional phenol-formaldehyde, urea-formaldehyde and furan resins, and this tends to limit the use of epoxy resins except for special applications. A particularly good process which reduces the shortcomings exhibited by the conventional resins such as long curing times, employs a heated, epoxy-wetted sand mixture which is packed in the form and the mass cured rapidly by filling the permeable voids with a gaseous curing agent such as ammonia. While this process did eliminate many of the shortcomings, special machinery was required including pressure sealing means, and some permeation difficulties are encountered when special intricate shapes are involved.

Another system described in U.S. 3,107,403 which attempted to overcome the lengthy curing time and effect a fast cure involved the use of epoxy resins and $BF_3$ gas. However, in the use of $BF_3$ many precautions have to be taken to protect against the extreme corrosiveness of the gas. And, since $BF_3$ has such a great affinity for water, the cores require nearly 0% relative humidity to be effective. This difficulty is no less troublesome than an oven bake, required for the heat curable resins. Further, the gas is known to be highly toxic and additional equipment would probably be required to absorb the excess gas and avoid air pollution. In addition to these shortcomings, in using $BF_3$ gas, as in the use of ammonia, one encounters permeation difficulties when special intricate shapes are used and thus portions of the cores do not cure sufficiently.

A method described in U.S. 3,268,466 presents cold-hardening foundry core compositions comprising sand, epoxy resins, a compound with an amine group (n-aminoethylpiperazine), and furfuryl alcohol. These compositions, however, still require a substantial amount of time to cure at room temperature, e.g., at least 1½ to about 24 hours and if more rapid cures are to be effected the core must be heat cured.

Another system for preparing foundry cores employs a drying oil and an isocyanate resin which are mixed separately with two sand streams. Simply, the mixing process employs a mixing machine which utilizes two parallel ribbon blenders for mixing the blender which mixes the two sand streams and permits the oil and isocyanate resin to react. This stream is then emptied into the core blower. The cores then require 4 to 5 minutes to strip at ambient temperature but require from 4 to 16 hours additional time to develop full usable strength. An alternate system utilizes furfuryl alcohol cured with a phosphoric acid catalyst. This, too, requires 10 minutes or more to cure in the mold bond and one to 12 hours aging before it can be used. It also has an objectionable odor during mold heating and metal pouring.

An improved process was developed for preparing foundry cores which has all the attractive features which are absent in the above-noted processes including: (1) adaptable to currently used foundry equipment; (2) low to moderate material cost; (3) extremely fast cure without loss of control; (4) low toxicity; (5) low corrosion rate; (6) ambient temperature cure; (7) no post cure; and (8) excellent handling qualities.

This improved process is described in my copending patent application Ser. No. 131,460, filed Apr. 5, 1971, which is a continuation-in-part application of Ser. No. 796,163, filed Jan. 17, 1969, now abandoned.

The process and compositions described therein produce excellent foundry cores in a minimum of time; however, for some applications such as the use of extremely large molds or complex mold on core boxes that additional working time may be required or desirable, the cure time for the process described in Ser. No. 131,460, is about 4 to 6 minutes wherein "cure time" is defined as the time interval from when the sand/resin/curing agent blend is placed in the core box until the core is removed from the core box.

It has now been discovered that the "working life" can be increased, wherein the term "working life" is defined as the time interval from when the sand-resin-curing agent blend is placed in the core box until the mixture becomes viscous to properly place in the convolutions of the core box, i.e., at least double or longer, to about 8 to 10 minutes and longer by simply incorporating a small amount of a monofunctional aromatic tertiary amine such as dimethylaniline into the curing blend, i.e., into the boron trifluoride complex-oxygenated hydrocarbon mixture. This increase, and therefor control over cure time, is obtained without measurably altering the superior properties of the binder system. It is equally unexpected to discover that other aromatic amines such as aniline and other aliphatic amines such as triethylamine or diethylenetriamine do not produce this desirable increase in cure time.

SUMMARY OF THE INVENTION

This invention provides an improved method for consolidating inert particles by mixing from about 80 to 99 parts by weight of inert particles such as sand, aluminum silicate, zirconium oxide, metal particles, glass fibers, etc. with from 1 to 20 parts by weight of a polyepoxide binder, mixing the polyepoxide/sand blend with a curing blend or mixture comprising (a) from 0.5 to 40.0 parts per 100 parts of polyepoxide of boron trihalide complexes, especially boron trifluoride complexes, in an oxygenated hydrocarbon, and (b) from 0.1 to 15% by weight based on the curing blend of an aromatic amine, packing and forming the mix and allowing the mix to cure at ambient temperatures. The process of the invention can also be carried out by simultaneously mixing the inert particles with the polyepoxide binder and the boron trifluoride complex-oxygenated hydrocarbon-aromatic tertiary amine mixture.

More particularly, the invention provides a method for consolidating sand for foundry core materials. The instant method is also suitable for manufacturing porous, low-cost, light weight products such as filter media, building bricks, diffusion plates, syntactic foams for light weight, high strength requirements and vacuum forming molds.

Other uses for such composite sand-resin materials are as filter media for oil and gasoline in combustion engines and elsewhere, decorative building bricks, diffusion panels, syntactic foams for light weight, high-strength requirements. Also, strong, chemically resistant panels can be made when random fibers are bonded in the above manner.

Porous dies made with this material for forming thermoplastic sheet apply vacuum uniformly for good reproduction. Air can be applied to remove the part and cool the die. Dies for pressure moldings can be heated and/or cooled during the molding cycle by passing fluids through the die. Fine metal particles may be substituted for the sand to improve maleability and heat dissipation.

Cured epoxy resins currently are very expensive and some cost in excess of $40.00 per cubic foot. By using a low cost filler such as silica flour, the cost can be reduced by about one-half. The present process produces a composite which reduces the cost to less than 10% of the cost of previous epoxy compositions, while still retaining most of the outstanding chemical resistance and mechanical strength characteristic of the epoxy resins.

It will be appreciated that the present process eliminates or significantly reduces the shortcomings of the prior art methods. For example, a unique feature of the present process circumvents the obvious difficulty of mixing quickly and completely (a) a fast curing resin-catalyst combination and then (b) mixing the blend uniformly with sand at a 1 to 50 ratio before curing begins to occur.

Simply, these advantages are achieved by first dispersing the resin binder in the sand by conventional mixing techniques. The resin-sand blend is then stable and may be stored idefinitely. Before use, the curing combination of (a) special boron trifluoride complexes with an oxygenated hydrocarbon and (b) aromatic tertiary amines is then added to the resin-sand blend, and the resulting mix packed into a suitable mold and allowed to cure. Or the resin binder and curing agent blend can be dispensed side-by-side into a continuous sand mixer.

DESCRIPTION OF THE PREFERRED EMBODIMENT

As noted hereinbefore, the present invention provides an improved process for consolidating sand to manufacture foundry cores. The present method can be effectively employed to produce many bonded materials of construction such as porous filters, porous dies and structural members; however, the following disclosure will be directed more particularly to the production of foundry cores. It is understood that such description does not limit the invention.

In general, the actual techniques involved in foundry core preparation form no part of the present invention and any conventional technique for forming such sand cores may be employed.

In one embodiment, the sand and the polyepoxide resin are mixed thoroughly. This blend is stable since no curing agent is present and may be stored indefinitely. Before use, the curing agent blend containing the boron trihalide and aromatic tertiary amine is added to the resin-sand blend so that the ratio of boron trihalide complex to polyepoxide is about 0.5 to about 40.0, and preferably, 1.0 to 20.0 parts per 100 parts by weight of the polyepoxide. The resulting blend is then packed into a suitable mold and the mass allowed to cure. It is believed that the vigorous exotherm from the reaction is contained by the heat capacity of the sand. The second mixing step is readily achieved in thirty seconds using conventional mixing equipment and the resulting sand core system then cures in about two to twenty minutes at ambient temperatures to provide a usable core.

Alternatively, both the polyepoxide binder and the boron trihalide complex-aromatic tertiary amine can be added to the sand simultaneously in a continuous sand mixer. Again, since there is a great excess of sand, it acts as a heat sink and the heat from the reaction is contained.

THE INERT PARTICLES

In the usual practice of the invention, sand or other suitable foundry core-forming inert compositions will be used as the filler, but other inert particles may be utilized in the practice of the present process. In general, the inert particles should be finely divided and have a mesh size varying from about 4 to 300, and preferably should be a homogeneous mixture of particles from AFS30 to AFS90. Suitable inert materials include, among others, sand, crushed rocks, metal powders, chips, ground walnut shells, spheres, crushed quartz, aluminum oxide, hollow glass or plastic spheres or glass fibers and finely divided resinous particles. Mixtures of various types of particles may also be used. Preferred are the minerals, especially preferred is silica sand.

It has been found that washed silica, zircon, chromite and aluminum silicate give excellent response. Best results have been obtained using relatively dry sand; that is, the moisture content is less than 0.5 percent by weight, and preferably will be less than the percentage at which the curing agent is present. That is, if the binder is present at 1 percent by weight of sand and curing agent is present at a level of 0.2 percent by weight of sand, total moisture should not exceed 0.2 percent by weight of sand.

In general, the sand-polyepoxide blend comprises from about 80 to 99 parts by weight of inert material (sand) and, from about 1 to 20 parts by weight of polyepoxide binder. For most foundry core applications, however, the blend comprises from about 95 to 99 parts by weight of sand and from about 1 to 5 parts by weight of polyepoxide.

In general, the sand and the polyepoxide binder are blended at ambient temperatures of from about 75° F. to 120° F., and at atmospheric pressure.

THE POLYEPOXIDE BINDERS

The resin binders which are suitable for the present process include the polyepoxides. The materials are compounds possessing more than one vicinal epoxy group, i.e., more than one

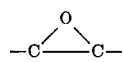

group. These compounds may be saturated or unsaturated, aliphatic, cycloalphatic, aromatic or heterocyclic and may be substituted with substituents, such as chlorine, hydroxyl groups, alkoxy groups and the like. They may be monomeric or polymeric. It is understood that these polyepoxide binders may be a blend of various polyepoxides or a polyepoxide with a monoepoxide.

For clarity, many of the polyepoxides and particularly those of the polymeric type are described in terms of epoxy equivalent values or "epoxy equivalency." The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12-octadecadienoate, butyl 9,12-octadecadienoate, butyl 9,12,15-octadecatrienoate, butyl eleostearate, monoglycerides of tung oil, fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, di(2,3-epoxybutyl) adipate,
di(2,3-epoxybutyl) oxalate,
di(2,3-epoxyhexyl) succinate,
di(3,4-epoxybutyl) maleate,
di(2,3-epoxyoctyl) pimalate,
di(2,3-epoxybutyl) phathalate,
di(2,3-epoxyoctyl) tetrahydrophthalate,
di(4,5-epoxydodecyl) maleate,
di(2,3-epoxybutyl) terephthalate,
di(2,3-epoxypentyl) thiodipropionate,
di(5,6-epoxytetradecyl) diphenyldicarboxylate,
di(3,4-epoxyheptyl) sulfonyldibutyrate,
tri(2,3-epoxybutyl) 1,2,4-butanetricarboxylate,
di(5,6-epoxypentadecyl) tartarate,
di(4,5-epoxytetradecyl) maleate,
di(2,3-epoxybutyl) azelate,
di(3,4-epoxybutyl) citrate,
di(5,6-epoxyoctyl) cyclohexane-1,3-dicarboxylate,
di(4,5-epoxyoctadecyl) malonate.

Another group of the epoxy-containing materials include those epoxidized esters of unsaturated alcohols and unsaturated carboxylic acids, such as 2,3-epoxybutyl 3,4-epoxypentanoate, 3,4 - epoxypentanoate, 3,4-epoxycyclohexyl 3,4-epoxycyclohexanoate, 3,4-epoxycyclohexyl 4,5-epoxyoctanoate, 2,3-epoxycyclohexylmethyl epoxycyclohexane carboxylate.

Still another group of the epoxy-containing materials included epoxidized derivatives of polyethylenically unsaturated polycarboxylic acids such as, for example, dimethyl 8,9,12,13-diepoxyeiconsanedioate,
dibutyl 7,8,11,12-diepoxyoctadecanedioate,
dioctyl 10,11-diethyl-8,9,12,13-diepoxyeicosanedioate,
dihexyl 6,7,10,11-diepoxyhexadecanedioate,
didecyl 9-epoxy-ethyl-10,11-epoxyoctadecanedioate,
dibutyl 3-butyl-3,4,5,6-diepoxycyclohexane-1,2-dicarboxylate,
dibenzyl 1,2,4,5-diepoxycyclohexane-1,2-dicarboxylate and
diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexane-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexane and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers, and the like.

Other suitable polyepoxides include the 3,4-epoxycyclohexylmethyl 3,4 - epoxycyclohexane carboxylates which are, in general, free of any functional groups other than epoxy. Preferably, such diepoxides may be represented by the structural formula:

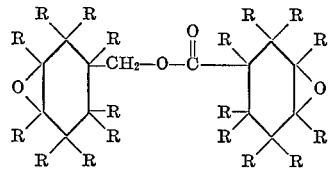

wherein R is a hydrogen or lower alkyl group, preferably from 1 to 5 carbon atoms. These diepoxides may be easily prepared by the action of peracetic acid and unsaturated cycloaliphatic ester such as 3-cyclohexenylmethyl 3-cyclohexenecarboxylate. These unsaturated cycloaliphatic esters are also readily prepared by subjecting selected cyclic unsaturated aldehydes to the Tischenko reaction in the presence of an aluminum alkoxide catalyst. The 3,4-epoxycyclohexylmethyl 3,4-epoxycyclohexanecarboxylates obtainable by this procedure include 3,4-epoxycyclohexylmethyl 3,4-epoxy cyclohexane carboxylate and the alkyl-substituted, and preferably the lower alkyl-substituted homologues thereof such as, for example, 3,4-epoxy-1-methylcyclohexylmethyl 3,4-epoxy-1-methylcyclohexanecarboxylate,
3,4-epoxy-2 or 5-methylcyclohexylmethyl 3,4-epoxy-2 or 5-methylcyclohexanecarboxylate,
3,4-epoxy-3-methylcyclohexylmethylcyclohexanecarboxylate,
3,4-epoxy-4-methylcyclohexylmethyl 3,4-epoxy-4-methylcyclohexanecarboxylate, and
3,4-epoxy-6-methylcyclohexylmethyl 3,4-epoxy-6-methylcyclohexanecarboxylate.

The polyepoxides that are particularly preferred for use in the compositions of the invention are the normally liquid glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in above noted U.S. 2,633,458 are good examples of polyepoxides of this type. These are both glycidyl polyethers of 2,2 - bis(4-hydroxyphenyl)propane(bis-phenol A). Especially useful is the polyether which exhibits an average molecular weight of about 340–380 and an epoxide equivalent weight of about 185–192.

Other preferred polyepoxides include the condensation products of epichlorohydrin and aliphatic polyols such as glycerol. A preferred polyepoxide of this type is a mixture of branched di- and tri-epoxides made by the condensation of epichlorohydrin and glycerol and having an epoxide equivalent weight of from about 140–160 and an average molecular weight of from about 300 to 350.

Because of high viscosities of some of the epoxy binders, it is often advantageous to employ diluents or viscosity reducers to improve the ease of handling. Reactive diluents suitable for this purpose include phenyl glycidyl ether, butyl glycidyl ether, styrene oxide, furfural, furfuryl alcohol, glycidyl esters of alpha-branched, saturated aliphatic, monocarboxylic acids, and others. Non-reactive diluents include ethyl naphthalene, coal tar, pine oil and xylene.

Co-reactive diluents which appear to react with the polyepoxide under the influence of the BF$_3$ complex include ethylene and propylene glycols and their polymers.

In general, up to about 25% by weight of the polyepoxide may be replaced with one or more of the above-noted reactive or non-reactive diluents. Other additives may be added as desired such as surface tension depressants, wetting agents, solvents, adhesion promoters, mold release agents, etc.

Especially preferred as reactive diluents are the glycidyl esters of alpha-branched, saturated monocarboxylic acids, for not only are these compounds useful for reducing viscosity, but also enter into the reaction via their epoxy groups and therefore the reactivity is not significantly reduced. Further, the branched structure of these diluents tends to improve moisture stability of the binder.

Thus, it has been found that an especially preferred binder is a mixture of a glycidyl polyether of a polyhydric phenol with a glycidyl ester of an alpha-branched saturated monocarboxylic acid. Particularly effective in this regard is a mixture of a normally liquid glycidyl polyether of 2,2-bis(4-hydroxyphenyl)propane and a glycidyl ester of the formula

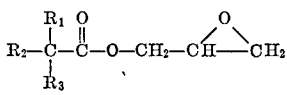

wherein R$_1$ and R$_2$ are alkyl radicals of 1–15 carbons, R$_3$ is a hydrogen or hydrocarbyl, which are useful in the preparation of these esters. Examples of the acids are pivalic acid, alpha, alpha-dimethyldecanoic acid, alpha, alpha-dimethylhexadecanoic acid and mixtures thereof. These tertiary acids (alpha-branched) may suitably be prepared by reaction of formic acid or carbon monoxide and water with olefins, in the presence of liquid acid catalysts, such as H$_2$SO$_4$, H$_3$PO$_4$, BF$_3$, HF and combinations of these and other catalysts known in this field of art. Suitable such alpha-branched, saturated monocarboxylic acids may be represented by the general formula

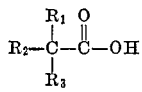

wherein R$_1$ and R$_2$ each represents the same or different alkyl radicals of normal, branched or cyclic structure and R$_3$ represents hydrogen or a hydrocarbyl radical. In the foregoing formula, R$_1$ and R$_2$ each may be a methyl, ethyl, propyl, butyl, pentyl, octyl, decyl, etc. radical. Hydrocarbyl radicals represented by R$_3$ comprise, for example, alkyl radicals of normal, branched or cyclic structure, including methyl, ethyl, propyl, butyl, pentyl, hexyl, octyl, as well as alkaryl, aralkyl and aryl radicals. Very suitable such monocarboxylic acids include the alpha,alpha-dialkyl monocarboxylic acids having from 9 to about 22 carbon atoms in the molecule. A preferred group comprises the acids possessing from about 9 to 19 carbon atoms with those acids having from 9 to 11 being especially preferred. Suitable methods for their preparation are disclosed in U.S. 3,047,662, U.S. 3,059,004, U.S. 3,059,005 and U.S. 3,059,006. The saturated monocarboxylic acids preferably have at least 8 carbon atoms per molecule.

The glycidyl esters of the above monocarboxylic acids may be prepared in any of the known ways for obtaining epoxy esters from monocarboxylic acids. A preferred method for preparing such esters is set forth in a United States Pat. No. 3,178,454, issued Apr. 13, 1965, of Nantko Kloos and Jacques J. J. Drost.

Preferred are the glycidyl esters of the general formula

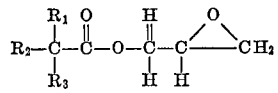

wherein R$_1$ and R$_2$ are each alkyl radicals such as methyl, ethyl, propyl, butyl, pentyl, nonyl, etc., and R$_3$ is hydrogen or an alkyl radical and R$_1$, R$_2$ and R$_3$ contain the sum total of from 2 to about 20 carbon atoms and preferably from about 7 to 17 carbon atoms.

A very preferred glycidyl ester is the glycidyl ester of a mixture of alpha-branched, saturated, aliphatic monocarboxylic acids containing 9 to 11 carbon atoms and prepared by the process described in Example I of U.S. 3,268,462, issued Aug. 23, 1966. A very suitable such glycidyl ester is available commercially under the trade name of Cardura® E Resin and which is the glycidyl ester of a mixture of saturated monocarboxylic acids having a chain length of 9–11 carbon atoms, and largely consisting of tertiary acids (about 94%). As used herein the term glydicyl ester includes the glycidyl ester of a single acid as well as esters of mixtures of acids.

It has been found that about 80–98 parts by weight of the polyepoxide mixed with 2–20 parts by weight of the glycidyl ester produces an effective binder. Particularly effective is a mixture of about 90–95 parts by weight of the polyepoxide with 5–10 parts by weight of the glycidyl ester.

THE CURING AGENTS

Suitable curing agents comprise certain boron trihalide complexes, i.e., BX$_3$ wherein X is a halogen such as the boron trifluoride etherates, phenolates, alcoholates and hydrates and the corresponding boron trichloride complexes. Especially preferred is boron trifluoride dihydrate.

Although boron trifluoride amine complexes are known as curing agents for polyepoxides (U.S. 2,824,083), it has been found that they are unsuitable for the purposes of this invention since they cure too slowly and require elevated temperatures to cause the polyepoxide binder to polymerize.

The BF$_3$ complexes may be prepared by conventional methods. The boron trifluoride etherates and hydrates are simply prepared by passing BF$_3$ gas into an ether such as diethyl ether, or water, respectively. It will be appreciated also, that the BF$_3$-phenolates are prepared by conventional techniques wherein BF$_3$ is reacted with phenol.

Although the boron trifluoride phenolate complex can be utilized as a curing agent, it is difficult to use because it is so fast acting and difficult to handle. In addition to this disadvantage, the BF$_3$ phenolate darkens on standing, thus showing a certain instability. This complex also exhibits the undesirable characteristic of forming a cloud of "smoke" when exposed to the air. Although the BF$_3$ etherates are even worse in this regard, the BF$_3$ dihydrate does not exhibit similar characteristics, and this is another reason why the latter complex is preferred.

A curing amount of curing agent is that amount necessary to properly cure the polyepoxide so that an adequate foundry core will be made. This usually amounts to from 0.5 to 40.0 parts of the boron trifluoride complex per 100 parts of polyepoxide binder. Particularly effective is from 1.0 to 20.0 parts of the BF$_3$ complex per 100 parts of polyepoxide binder.

THE OXYGENATED HYDROCARBONS

It is preferable, and in some case necessary, particularly if the BF$_3$-catalyst is a solid, to employ one or more diluents such as an aliphatic polyol such as glycerol, ethylene glycol, hexanetriol, hexylene glycol, polypropylene glycol; ketones such as acetone, methylethyl ketone, methylisobutyl ketone, isophorone, etc.; esters such as ethyl acetate, butyl acetate, Cellosolve acetate (ethylene glycol monoethyl ether monoacetate), methyl Cellosolve acetate (acetate of ethylene glycol monomethyl ether); chlorinated hydrocarbons such as trichloropropane, chloroforms, etc.; and diethyl phthalate and dibutyl phthalate; and ethers such as polypropylene glycol (MW 150, 425 or 1000) polyethylene glycol, dimethoxy ethane, and the diethyl ether of diethylene glycol. However, it has been found that certain of these diluents, such as hexylene glycol, although useful if used relatively soon after mixing, should not be used if the curing agent is to be stored in the diluent for an extended period of time since an unstable mixture is formed. Other diluents, such as the chlorinated hydrocarbons, exhibit certain disadvantages as well. Preferred are the oxygenated hydrocarbon diluents and the aliphatic polyols are particularly suitable.

Although not understood at the present time, it is believed that the polyols enter into the reaction and for this reason certain diluents are preferred. It has been found that polyalkylene glycols such as polyethylene glycol and polypropylene glycol, especially the latter, are particularly preferred in the process of this invention. Low molecular weight of polyalkylene glycol are desirable for the attainment of a manageable viscosity but have high hydroxyl contents and therefore give softer polymers, Higher molecular weight polyalkylene glycols, while giving hard polymers, form crystalline adducts of boron trifluoride dihydrate. So it has been found that a blend of a low molecular weight polyalkylene glycol with one of a higher molecular weight produces the best results. Thus, a mixture of polypropylene glycol of molecular weight up to 250 and polypropylene glycol of molecular weight of 350–500 is particularly effective. Generally, the mixture can be about 25–75% of the lower molecular weight polypropylene glycol and the difference of the higher molecular weight polypropylene glycol. Most effective is a mixture of about 50% of each of a polypropylene glycol 150 and a polypropylene glycol 425.

In general, the diluent is employed in amounts to give a 5–50% by weight solution of the boron trifluoride complex in the diluent.

THE AROMATIC TERTIARY AMINES

Suitable aromatic tertiary amines include the substituted anilines having the general formula

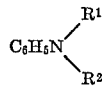

wherein $R^1$ and $R^2$ are each hydrocarbon radicals, preferably lower alkyl radicals. Suitable such tertiary amines, include among others, dimethylaniline, methylethylaniline, diethylaniline, dipropylaniline and diisopropylaniline. Other aromatc tertiary amines include the benzyldialkylamine of the general formula

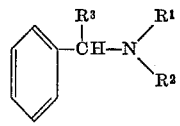

wherein $R^1$ and $R^2$ are each lower alkyl radicals and $R^3$ is hydrogen or a lower alkyl radical. Suitable such benzyldialkylamines include among others, benzyldimethylamine, benzyldiethylamine, benzyldipropylamine, alpha-methylbenzyldimethylamine, alpha-methylbenzyldiethylamine, alpha-ethylbenzyldimethylamine, etc.

Other suitable aromatic tertiary amines include N,N-dimethylnaphthylamine, N,N-diethylnaphthylamine, N,N-dimethylcyclopentylamine, N,N-dimethyl-o-chloroaniline, N,N-dimethyl-p-ethylaniline, N,N-dimethylxylidine, N,N-dimethyltoluidine, N,N-dimethyltetrahydrofurfurylamine.

In general, the monofunctional aromatic tertiary amines are simply added to the boron trifluoride-oxygenated hydrocarbon curing blend. The amount employed will depend upon many factors such as time and the particular epoxy resin, curing agent and amine; however, the amine is generally employed in amounts from about 0.1 to about 20% by weight based on the boron-trihalide-oxygenated mixture, with from about 1% to 10% being preferred.

The invention is illustrated by the following examples. The reactants, their proportions and other specific ingredients are presented as being typical and are not to be construed as limiting. Unless otherwise specified, parts and percentages disclosed are by weight.

EXAMPLE I

This example illustrates the effectiveness of the use of dimethylaniline in controlling the cure time of a $BF_3$-dihydrate curing of a polyepoxide resin binder system.

A commercial diglycidyl ether of bisphenol resin with a viscosity of 120 poises at 25° F. and an equivalent weight per epoxy of 188 was used at a level of one and one-half percent on the weight of sand used to form a foundry core base mixture.

When the above sand-resin blend was cured with a curing agent composed of 20 percent by weight of boron trifluoride dihydrate, 40% of polypropylene glycol with a molecular weight of 150, and 40% of polypropylene glycol with a molecular weight of 425, using a resin to curing agent ratio of 5:1 wt., the polymer set in four minutes. The useable life (to pack the mixture into the core box) was two minutes.

When one hundred parts by weight of the curing agent was modified by the addition of 10 parts by weight of N,N-dimethylaniline the cure time was extended to 15 minutes and the useful life was about 8 minutes. When 100 parts of the curing agent was modified by adding five parts by weight of N,N-dimethylaniline, the cure time was 8 minutes and the useable life was four minutes. In all cases the final core was hard and showed a tensile strength of 200 pounds per square inch. All cores could be used to make useful gray iron castings.

EXAMPLE II

This example illustrates the ineffectiveness of an aliphatic amine, e.g., diethylenetriamine, in controlling cure times.

The procedures of Example I were essentially repeated wherein the resin, sand, curing agent system described therein was modified by using diethylenetriamine to attenuate the cure speed of the curing agent blend.

When 10% by weight of diethylenetriamine was added to the curing agent, a moderate amount of heat was generated. The clear solution became pink and a second liquid phase caused it to become cloudy.

When 5% by weight of diethylenetriamine was added to the curing agent blend a slight exotherm developed. No color change occurred but a small amount of second liquid phase again produced a milky appearance.

When either of the above curing agent blends were used with a sand-resin mixture in the usual 4:1 resin to curing agent ratio, no cure occurred after twenty hours at 77° F.

EXAMPLE III

This example illustrates the ineffectiveness of an aromatic primary amine, e.g., in controlling cure times.

The procedures of Example I were essentially repeated wherein tris-(dimethylaminomethyl) phenol (DMP 30, Rohm and Haas) was used to modify the curing agent blend.

When 10% by weight of DMP 30 was added to the curing agent a slight amount of heat was generated, the solution became cloudy, assumed a brown color and as it cooled to room temperature gelled to a non-flowable petrolatum consistency.

At 5% by weight tris (dimethylaminomethyl) phenol gave an insignificant exotherm but again formed a gel. No color developed in this case but a second phase was present.

At 10% cure of the resin system did not occur in an hour. The 5% modification cured in nine minutes to a useable core but the gel structure and second phase limit the usefulness of such a blend.

EXAMPLE IV

The procedures of Example I were essentially repeated wherein three separate portions of the curing agent described in Example I was each modified with 10% of aniline, benzyldimethyl amine and triethylamine. All were pale yellow or greenish yellow, single phase liquids.

The curing agent modifications were used to cure sand-resin blends as described in Example I.

When the curing agent blend contained 10% of triethylamine or aniline, no cure occurred in an hour and a half.

When benzyldimethyl amine was used, the system became hard in twenty-three minutes.

A second modification of the curing agent with 5% of benzyldimethylamine used in the same way gave a useable blend that caused the sand mixture to harden in eight minutes.

Both systems produced cores that cores achieved tensile strengths of 200 p.s.i. in two hours.

I claim as my invention:

1. A process for consolidating inert particles which comprises:
   (1) blending from about 80 to 99 parts by weight of inert particles with 1 to 20 parts by weight of a polyepoxide containing at least one vic-epoxy group.
   (2) mixing said blend with (a) from about 1 to 20 parts per 100 parts by weight of the polyepoxide of a boron trifluoride complex selected from the group consisting of boron trifluoride dihydrate, boron trifluoride etherate, boron trifluoride alcoholate, and boron trifluoride phenolate, said boron trifluoride complex being added as a 5–50% by weight solution in a liquid oxygenated hydrocarbon diluent, and (b) from about 0.1 to 20 parts per 100 parts of the boron trifluoride complex solution of an aromatic tertiary amine selected from the group consisting of (a) anilines of the general formula

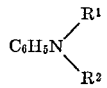

wherein $R^1$ and $R^2$ are each lower alkyl radicals, (b) benzyldialkylamines of the general formula

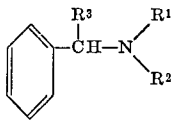

wherein $R^1$ and $R^2$ are each lower alkyl radicals and $R^3$ is hydrogen or a lower alkyl radical and (c) N,N-dialkylnaphthalenes,
   (3) packing said mixture into suitable molds, and
   (4) allowing the mixture to cure at ambient temperature.

2. The process of claim 1 wherein 95 to 99 parts by weight of inert particles are blended with 1 to 5 parts by weight of the polyepoxide and 1.0 to 20 parts per 100 parts by weight of the polyepoxide of the boron trifluoride complex.

3. The process of claim 1 wherein the polyepoxide is a liquid glycidyl polyether of 2,2-bis(4-hydroxyphenyl) propane.

4. The process of claim 3 wherein the glycidyl polyether has an average molecular weight of about 340–380 and an epoxide equivalent weight of about 185–192.

5. The process of claim 1 wherein the polyepoxide is a mixture of 80 to 98 parts by weight of a liquid glycidyl polyether of 2,2-bis(4-hydroxyphenyl) propane and 2 to 20 parts by weight of a glycidyl ester of alpha-branched, saturated monocarboxylic acids of from 2 to 20 carbon atoms.

6. The process of claim 1 wherein the boron trifluoride complex is boron trifluoride dihydrate.

7. A process as in claim 1 wherein the oxygenated hydrocarbon diluent is a polyalkylene glycol.

8. The process of claim 7 wherein the polyalkylene glycol is polypropylene glycol.

9. The process of claim 8 wherein the polypropylene glycol is a mixture of 25 to 75 parts by weight polypropylene glycol of molecular weight about 150 and 25 to 75 parts by weight polypropylene glycol of molecular weight about 425.

10. The process of claim 1 wherein the polyepoxide is a diepoxide having a structural formula:

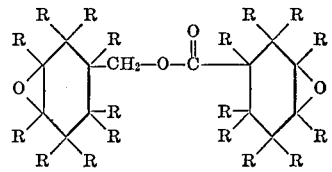

wherein R is selected from the group consisting of hydrogen and alkyl groups of from 1 to 5 carbon atoms.

11. The process of claim 10 wherein the diepoxide is 3,4-epoxy - 6 - methylcyclohexylmethyl-3,4-epoxy-6-methylcyclohexane-carboxylate.

12. The process of claim 1 wherein the amine is dimethylaniline.

13. The process of claim 1 wherein the inert particles are sand.

14. The process of claim 1 wherein the benzyldialkylamine is benzyldiethylamine.

References Cited

UNITED STATES PATENTS

| | | | |
|---|---|---|---|
| 2,824,083 | 2/1958 | Parry et al. | 260—33.4 Ep X |
| 3,004,952 | 10/1961 | Brueschweiler | 260—47 EN |
| 3,268,466 | 8/1966 | Simm | 260—37 Ep X |
| 3,107,403 | 10/1963 | Moore | 260—37 Ep X |

FOREIGN PATENTS

| | | | |
|---|---|---|---|
| 882,360 | 11/1961 | Great Britain | 260—47 EC |

LEWIS T. JACOBS, Primary Examiner

U.S. Cl. X.R.

260—37 Ep, Dig. 40